US010425686B2

(12) United States Patent
D'Acunto et al.

(10) Patent No.: US 10,425,686 B2
(45) Date of Patent: Sep. 24, 2019

(54) DEVICE-BASED DETECTION OF AMBIENT MEDIA TO BE USED BY A SERVER TO SELECTIVELY PROVIDE SECONDARY CONTENT TO THE DEVICE

(71) Applicant: Free Stream Media Corp., San Francisco, CA (US)

(72) Inventors: Loris D'Acunto, Palo Alto, CA (US); Damian Ariel Scavo, Palo Alto, CA (US)

(73) Assignee: Free Stream Media Corp., San Francisco, CA (US)

( * ) Notice: Subject to any disclaimer, the term of this patent is extended or adjusted under 35 U.S.C. 154(b) by 0 days.

(21) Appl. No.: 15/260,854

(22) Filed: Sep. 9, 2016

(65) Prior Publication Data
US 2017/0134801 A1     May 11, 2017

Related U.S. Application Data

(63) Continuation of application No. 14/695,804, filed on Apr. 24, 2015, now abandoned.
(Continued)

(51) Int. Cl.
| | |
|---|---|
| *H04N 21/422* | (2011.01) |
| *H04N 21/81* | (2011.01) |
| *H04N 21/437* | (2011.01) |
| *H04N 21/2668* | (2011.01) |
| *H04N 21/439* | (2011.01) |
| *H04N 21/258* | (2011.01) |
| *H04N 21/41* | (2011.01) |

(Continued)

(52) U.S. Cl.
CPC ..... *H04N 21/44213* (2013.01); *H04N 21/258* (2013.01); *H04N 21/2668* (2013.01); *H04N 21/4126* (2013.01); *H04N 21/42203* (2013.01); *H04N 21/437* (2013.01); *H04N 21/439* (2013.01); *H04N 21/4394* (2013.01); *H04N 21/812* (2013.01); *H04N 21/4431* (2013.01)

(58) Field of Classification Search
CPC ......... H04N 21/44213; H04N 21/4084; H04N 21/4394; H04N 21/439; H04N 21/437; H04N 21/812; H04L 67/16; H04L 67/20
See application file for complete search history.

(56) References Cited

U.S. PATENT DOCUMENTS

| | | | |
|---|---|---|---|
| 2005/0235174 A1* | 10/2005 | Curt | G05B 23/0224 713/340 |
| 2006/0206379 A1* | 9/2006 | Rosenberg | G06Q 30/02 705/14.54 |

(Continued)

*Primary Examiner* — Hoang Vu A Nguyen Ba
(74) *Attorney, Agent, or Firm* — Procopio, Cory, Hargreaves & Savitch LLP

(57) ABSTRACT

Techniques to provide content based on detected ambient media are disclosed. In various embodiments, a set of audio features extracted from audio data associated with an audio environment with which a client device is associated are received from the client device. A stored media signature data generated based on media content data from a source other than the client device is used to detect, based at least in part on the set of audio features, a media channel and program that is being played in the audio environment. A secondary content that is selected based at least in part on a semantic content data associated with the detected media channel and program is provided.

19 Claims, 8 Drawing Sheets

Related U.S. Application Data

(60) Provisional application No. 61/983,987, filed on Apr. 24, 2014.

(51) Int. Cl.
*H04N 21/442* (2011.01)
*H04N 21/443* (2011.01)

(56) References Cited

U.S. PATENT DOCUMENTS

| | | | | |
|---|---|---|---|---|
| 2012/0224706 A1* | 9/2012 | Hwang | ............... | G10L 15/10 |
| | | | | 381/56 |
| 2012/0311074 A1* | 12/2012 | Arini | ............... | H04N 21/44008 |
| | | | | 709/217 |
| 2013/0111514 A1* | 5/2013 | Slavin | ............... | H04H 60/64 |
| | | | | 725/18 |
| 2013/0308818 A1* | 11/2013 | MacIntosh | ............... | G06T 1/0021 |
| | | | | 382/100 |
| 2014/0044269 A1* | 2/2014 | Anderson | ............... | H04R 5/04 |
| | | | | 381/57 |
| 2015/0052115 A1* | 2/2015 | Sharifi | ............... | G06Q 30/0631 |
| | | | | 707/722 |

\* cited by examiner

DEVICE-BASED DETECTION OF AMBIENT MEDIA TO BE USED BY A SERVER TO SELECTIVELY PROVIDE SECONDARY CONTENT TO THE DEVICE

CROSS REFERENCE TO OTHER APPLICATIONS

This application claims is a continuation of U.S. patent application Ser. No. 14/695,804, filed Apr. 24, 2015, which claims priority to U.S. Provisional Patent Application No. 61/983,987, entitled DEVICE-BASED DETECTION OF AMBIENT MEDIA filed Apr. 24, 2014, which is incorporated herein by reference for all purposes.

BACKGROUND OF THE INVENTION

Users often consume media, such a live or on demand TV broadcast or other media content, in an environment (e.g., a room in their home or office) in which one or more devices are available for their use. For example, a TV show may be playing in a room in which one or more viewers each has access to a mobile phone, tablet, or other mobile device; a personal computer (PC), laptop, or other computing device; a smart TV or other "smart" consumer electronic device; etc. In current approaches, typically a user's experience with respect to such other devices has been distinct from the media being consumed in the environment.

BRIEF DESCRIPTION OF THE DRAWINGS

Various embodiments of the invention are disclosed in the following detailed description and the accompanying drawings.

DETAILED DESCRIPTION

Figure 1:
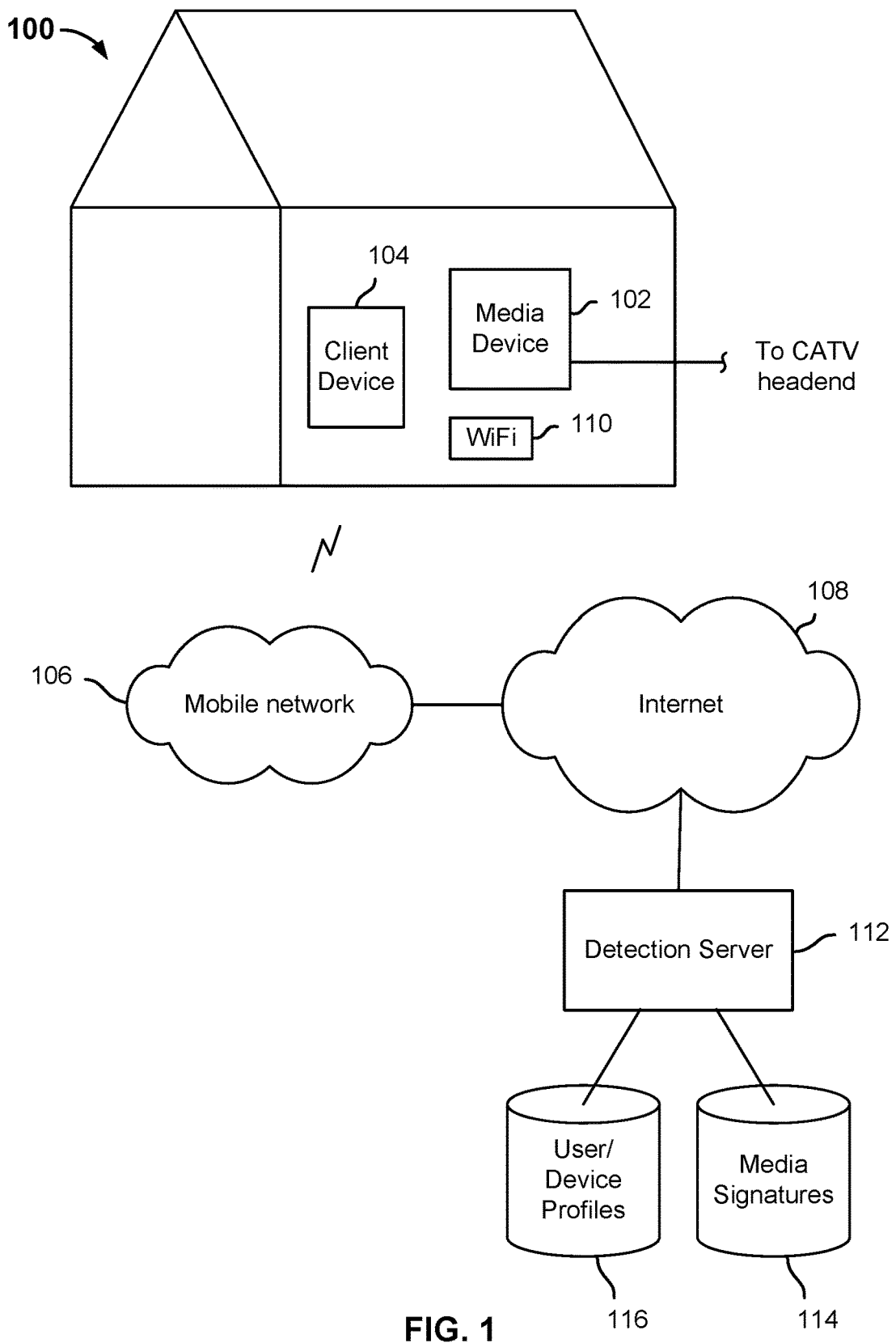
FIG. 1 is a block diagram illustrating an embodiment of a system to detect ambient media.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Using a device to detect that a TV or other media content is being rendered in an environment in which the device is present is disclosed. If the rendering of TV or other media content is detected, in various embodiments a process to recognize the content being rendered is performed.

For example, a representation of the content may be compared to a corresponding data associated with one or more specific TV shows, channels, etc. to determine a source and/or content of the TV or other media content the presence of which has been detected. Information known about the determined source and/or content, for example, may be used in various embodiments to perform one or more actions, such as to select and serve to the device used to detect the media content an ad or other content deemed to be relevant to the source and/or content of the media content detected in the environment.

In various embodiments, an architecture that optimizes the process of identifying whether a TV or other media player is switched ON and recognize which program, advertisement, or other content is being rendered, is used. For example, in some embodiments, before an attempt is made to determine which TV (or other media) channel is being rendered in the environment (which in various embodiments requires resources on the server side), techniques disclosed herein are used to be sure that the TV (or other media player) is ON.

In various embodiments, one or more of geo-localization, window time analysis, and sound level detection may be used to activate or deactivate the listening process.

In some embodiments, after a training period of time, the system can learn the habits of the user in order to activate or deactivate the listening process at suitable times.

In various embodiments, a TV Scanner element of a Perpetual TV Listening architecture recognizes if there is a TV switched ON close to a device in which a Perpetual TV listening client is installed (for ex. a smartphone, a TV, a gaming console, a computer, etc.).

FIG. 1 is a block diagram illustrating an embodiment of a system to detect ambient media. In the example shown, an ambient media detection system and environment 100 includes a media device 102, in this example a TV or other display device connected to a cable television (CATV) head end (or other audiovisual media distribution node). A client device 104 configured to detect media in an environment in which the client device 104 is located is present in the same location. In the example shown, the client device 104 is shown as a device separate from media device 102, but in various embodiments the client device 104 may be included in and/or the same as media device 102. Examples of media device 102, in various embodiments, include without limitation a "smart" TV or other media display device having a network connection and processor; a media player device; a gaming console, system, or device having a display and/or speakers; a home theater system; an audio and/or video component system; a home desktop or other computer; a portable device, such as a tablet or other smart device usable to play audiovisual content; etc. Examples of client device 104, in various embodiments, include without limitation one or more of the foregoing examples of media device 102 and/or any other device having or capable of being configured to include and/or receive input from a microphone, a processor, and a network or other communication interface, e.g., a cable TV decoder or other connectivity device (e.g., separate from a TV or other display); a gaming console, system, or device; a home desktop or other computer; a portable device, such as a tablet or mobile phone; etc.

In the example shown in FIG. 1, the client device 104 is configured to monitor an ambient audio environment in a location in which the client device 104 is present. In various embodiments, the client device 104 may be configured to monitor the ambient audio environment by accessing and using a microphone comprising and/or connected to client device 104. The client device 104 may be configured to execute software code, such as a mobile or other application and/or code incorporated into such an application, e.g., using a software development kit (SDK), or other techniques, to perform TV or other media content detection as disclosed herein.

In various embodiments, client device 104 is configured to sample the ambient environment to determine if conditions are present to enable media detection to be performed. For example, the client device 104 may determine whether an ambient sound level in proximity of the client device 104 is sufficiently high to perform media detection, whether characteristics possibly associated with media content are detected, etc. In some embodiments, client device 104 may be configured to attempt to perform media detection only at configured and/or configurable times, e.g., certain times of day, different times of day depending on the day of the week, on days/times learned over time to be times when the client device 104 may be in an environment in which media is being played (e.g., user often watches TV on weekday evenings but rarely during the workday, etc.), etc.

In the example shown in FIG. 1, client device 104 sends audio data and/or a representation thereof, such as a "feature" set extracted and/or otherwise determined from the ambient audio environment, via a wireless connection to an associated mobile network 106, which provides access to the Internet 108. In some embodiments, a WiFi access node, such as WiFi access node 110 in the example shown, may be used by client device 104. In various embodiments, any Internet or other network access (e.g., cable, mobile) may be used. However the connection to the Internet 108 is made, client device 104 uses the connection to send audio data and/or a representation thereof to a remote detection server 112.

Detection server 112 uses media content signatures in a media signatures database (or other data store) 114 to determine if data received from client device 114 matches known media content. For example, in some embodiments, media signatures 114 may include for each of a plurality of cable TV or other broadcast channels a corresponding set of "feature sets" each of which is associated with a media content and/or portion thereof that is being, was, and/or is expected to be broadcast (or otherwise provided, e.g., streamed, etc.), e.g., at an associated time of a given day. For example, a backend process not shown in FIG. 1 may be used to receive and process a stream or other set of media content data and associated times (e.g., timestamps) at which respective portions of the content have been and/or will be broadcast, streamed, etc.

In various embodiments, detection server 112 may be configured to determine based on data received from the client device 104 and the media signatures 114 that a particular cable or other TV channel is being viewed at the location in which the client device 104 sampled the ambient audio environment. In some embodiments, the detected channel and/or information determined based at least in part thereon may be communicated to one or more of the client device 104 and the media device 102. For example, advertising or other content associate with a program being broadcast on a cable channel that has been detected in the ambient audio environment may be served to the client device 104. In the example shown, detection server 112 may be configured to update one or more profiles associated with a user, a device (e.g., media device 102 and/or client device 104), and/or a location (e.g., one associated with media device 102 and/or client device 104, and/or determined based on a GPS or other location service of client device 104) may be updated in a user/device profiles database 116.

In various embodiments, user, device, and/or location profiles stored in profiles database 116 may include one or more of user profile data that was provided explicitly by and/or inferred about a user; historical data indicating which media channels have been detected in a given environment and/or by a given client device and at which times and days of the week, etc.; records of content or other data provide to a user, location, and/or device based at least in part on media channel and/or content detection, etc.

Figure 2:
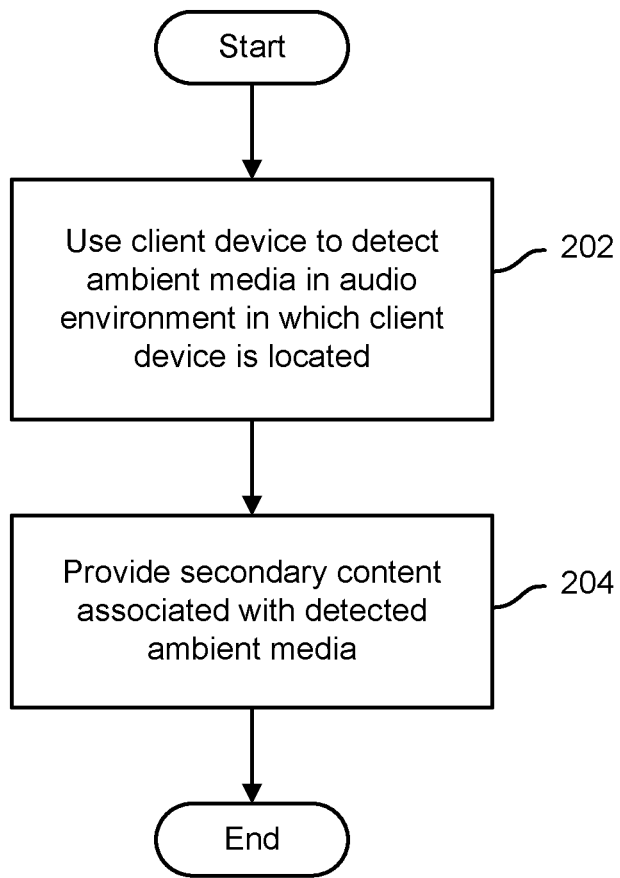
FIG. 2 is a flow chart illustrating an embodiment of a process to provide content related to detected media.

FIG. 2 is a flow chart illustrating an embodiment of a process to provide content related to detected media. In various embodiments, the process of FIG. 2 may be implemented by one or more client devices, e.g., client device 104 of FIG. 1, in communication and cooperation with one or more servers, e.g., detection server 112 of FIG. 1. In the example shown, a client device is used to detect ambient media in an audio (or other sensory) environment in which the client device is located (202). The client device may, in various embodiments, be configured to extract a feature set or other representation from ambient audio (or other) data and to send the feature set or other representation, and/or data derived therefrom, to a remote detection server. The server may be configured to receive and process feature sets or other representations received from respective clients. Secondary content associated with the detected audio (or other media) environment is provided (204). For example, the server may be configured to detect based on the received feature set that a media channel, e.g., that a given cable TV channel, is being viewed or otherwise rendered at a location in which the client is located. Based on the foregoing determination, the server may be configured to select related secondary content (e.g., advertising content, games, trivia questions, etc.) and provide the secondary content via an appropriate delivery channel, e.g., via the device being used to view the media channel and/or the device (if separate) used to detect the media environment.

Figure 3:
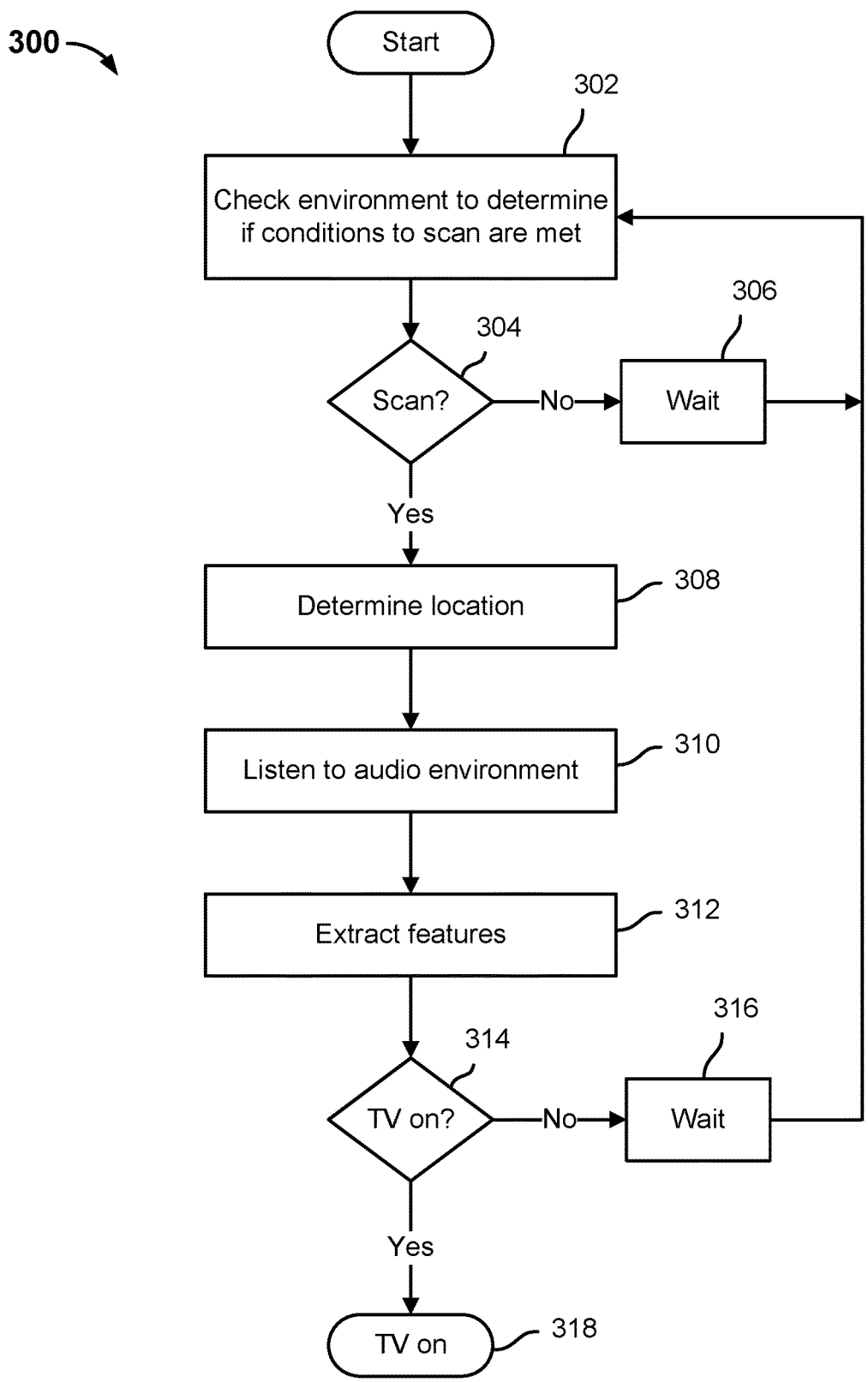
FIG. 3 is a flow chart illustrating an embodiment of a process to determine that TV or other media content is being rendered in an audio environment.

FIG. 3 is a flow chart illustrating an embodiment of a process to determine that TV or other media content is being rendered in an audio environment. In various embodiments, the process of FIG. 3 may be performed by one or more client devices, e.g., client device 104 of FIG. 1. In some embodiments, the process of FIG. 3 may be used to determine whether a media display device, such as a television (TV), may be "on" and being used to render a media channel at the location in which the client device is located. In various embodiments, the result of the process of FIG. 3 may be used to determine that a full scan of the ambient environment, e.g., to attempt to identify a specific media channel that is being rendered at the location, should be performed.

In the example shown in FIG. 3, the audio (or other sensory) environment is checked (302) to determine whether conditions required to perform media channel (or other media content) recognition are present. In some embodiments, the process of FIG. 4 may be used to make such a determination. If the environment conditions are not suitable (304), the client sleeps for a predefined amount of time (306) before checking the environment again (302). In some embodiments, all media scanner configurations are parameterized and can be redefined from the server side—in that way it is possible to tune the overall system from one single point (manually or using machine learning algorithms, for example).

On the other hand, if the prescribed environment conditions are present (304), the client installed on the device determines the current geographic location of the device (308). In various embodiments, this geo-location information may be used to send features extracted from the environment to the correct set of servers, reducing the cost of a single query. In some embodiments, on the server side there may be a first set of servers capable of recognizing US TV programs, another set to recognize UK TV programs, Germany, Italian, etc.

At this point the client starts to use the device's microphone and/or associated elements to listen to the environmental sounds (310). In various embodiments, the client may listen for a fixed amount of time (for example, for 10 seconds), which may be defined and changeable from the server side in some embodiments. The client extracts features (312) to be sent to the server. In various embodiments, the extracted features comprise a set of information representative of the audio content observed to be present in the environment, such as a hash, fingerprint, signature, or other representation of all or part of the observed audio content, and not an audio stream of the raw observed audio content. The extracted features may be used in various embodiments to recognize TV programs and commercials, or other media content, from the audio data represented by the extracted features. In some embodiments, such recognition may be performed even in noisy conditions. In some embodiments, the feature set stream is optimized to consume as low bandwidth as possible (e.g., a couple of kilobytes).

The server analyzes the stream of data and defines if the sound is related to a TV program or a commercial or other known media content and/or channel (314). If the server does not conclude based on the feature set data that there is a TV (or other media display/rendering device) switched on close to the listening device, the client sleeps for a prescribed amount of time (316) (the prescribed amount of time being capable of being defined, in some embodiments, from the server side). Otherwise, it is concluded that a TV or other media display device is switched on in the environment in which the listening device is located and the process ends successfully (318).

Figure 4:
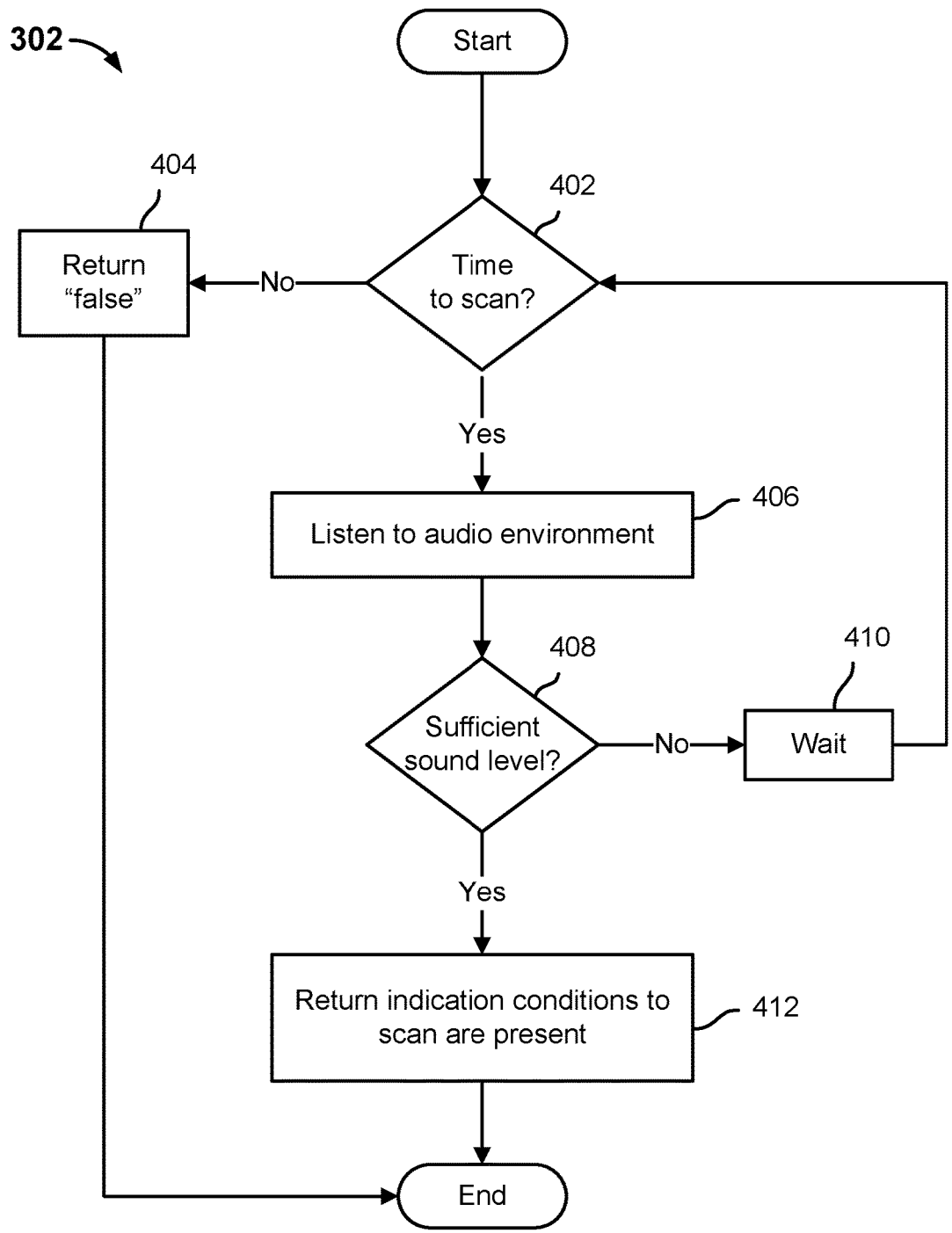
FIG. 4 is a flow chart illustrating an embodiment of a process to determine if conditions are suitable to determine whether TV or other media content is being rendered in an audio environment.

FIG. 4 is a flow chart illustrating an embodiment of a process to determine if conditions are suitable to determine whether TV or other media content is being rendered in an audio environment. In various embodiments, the process of FIG. 4 may be used to implement step 302 of the process of FIG. 3. The process of FIG. 4 may be performed by a client device, such as client device 104 of FIG. 1. In the example shown, a determination is made as to whether the current time is a suitable time to perform a scan (402). In various embodiments, a client software or other agent running on a client device may be configured (e.g., remotely, by a remote server) to wake up periodically and check to determine whether the time and other conditions are suitable to perform a scan, and an iteration of the process of FIG. 4 may be performed each time the client wakes up (or is woken up, e.g., by the server).

In some embodiments, initially the system uses a default window, e.g., from 7 am to 2 am, to determine whether the current time is a suitable time to scan (402). In some embodiments, this default window may be defined from the server side and/or may be changed over the time. Moreover, with time, collecting data from a particular device, the system in some embodiments may be configured to develop, e.g., through machine learning, an understanding of the behavior of the user over time, e.g., across weeks and/or months. The server may use machine learning algorithms (e.g., deep neural networks) to clusterize the user's behavior and to avoid attempting to perform TV recognition except during periods in which the system has learned that the user's TV generally is on (this window is referred to in some embodiments as the "trained window"). For example if the owner of the device is observed regularly to be home and using the TV during the day, the trained window could be from 7 am to 9 pm. On the other hand, if the owner of the device is observed to be home with the TV mostly only late at night, the trained window could be from 9 pm to 2 am.

If the time is determined to not be suitable to perform TV or other media recognition (402), the process returns an indication of the negative result (404) and the process of FIG. 4 ends. The process or component that called the process of FIG. 4 may be configured to call the process of FIG. 4 again later, e.g., after a configured, random, or other waiting period.

If the time is determined to be suitable to attempt to perform TV (or other media) recognition (402), the system listens to the sound present in the environment (406) (for example, for a fixed amount of time that could be change from the server) and it is determined whether the average level of sound is sufficient to start a TV scan (e.g., to determine whether a TV is "on" in the environment) or a TV recognition (e.g., to identify more specifically a particular channel and/or program that is being rendered in the environment) (408).

If the comparison of the sound level with a parameterized threshold fails (408), the client waits for a fixed amount of time (410) and then it restarts the process of FIG. 4. If the sound level is determined to be sufficient (408), a positive result is returned (412), e.g., to a process or component that called the process of FIG. 4.

Figure 5:
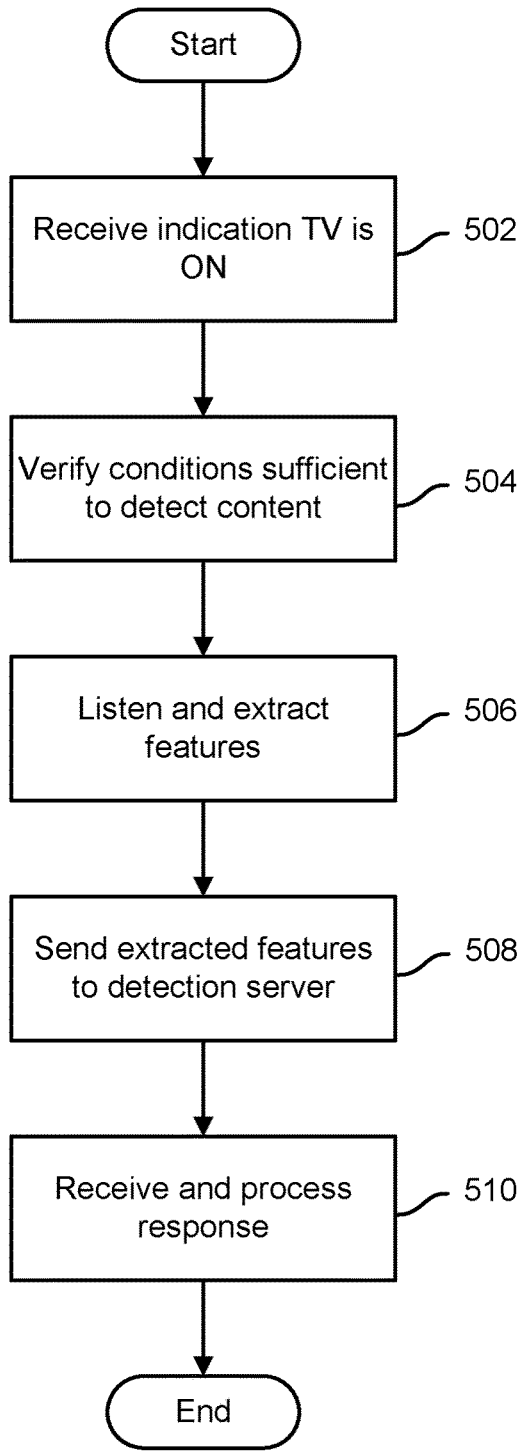
FIG. 5 is a flow chart illustrating an embodiment of a client-side process to determine that TV or other media content is being rendered in an audio environment.

FIG. 5 is a flow chart illustrating an embodiment of a client-side process to determine that TV or other media content is being rendered in an audio environment. The process of FIG. 5 may be performed by a client device, such as client device 104 of FIG. 1. In various embodiments, the process of FIG. 5 may be performed by a client device as part of a service to listen for, recognize, and potentially take action based on a determination that specific TV or other media content, e.g., a particular TV or other program, is being rendered in an environment in which a device performing the process of FIG. 5 is located. In various embodiments, the process of continuously, periodically, and/or regularly checking for the presence of a TV or other media content being rendered in an environment in which a device is located is referred to as "perpetual TV listening".

In the example shown in FIG. 5, an indication is received that a TV or other media player/display device is "on" (502). For example, the process of FIG. 3 may have been used to detect the presence in the audio environment of content associated with a TV or other player being "on". In the example shown, a check is performed to determine (or verify) that the conditions are (remain) suitable to detect a specific TV or other content that is being rendered (504) (see, e.g., FIG. 4). If the conditions are not suitable, the process restarts again with the TV (or other media) scan (see, e.g., FIG. 3).

If the conditions are suitable (504), the client listens to the environment sound for a period of time and extracts features to be used to identify the media being rendered near the detecting device (506). The extracted feature data and/or a representation thereof is/are sent (508) to a remote detection server, such as detection server 112 of FIG. 1, to be used at the server to perform TV program or commercial (or other media content) recognition.

In various embodiments, the server is configured to attempt to recognize the TV program, commercial, or other media content that is being rendered in the environment in which the client device performing the process of FIG. 5 is located. In various embodiments, the server may be configured to send to the client one or both of an identification of the media channel and/or content that has been detected and secondary content to be used by the client, e.g., to be displayed or otherwise made available to a user of the client device. The client receives and processes the response (510).

Examples of content that may be received by the client device include, without limitation, application data to be used by an associated application on the client device. For example, if a particular sporting event is detected, an associated fan application may be activated and may begin to retrieve associated content from an associated application server. Or, if content associated with a movie trailer or movie review is detected, an application usable to locate and purchase tickets to watch the movie in a local movie theater may be activated to present information about show times and/or purchasing tickets to see the movie, etc.

After data associated with a recognized TV program or commercial has been saved at the server and sent to the client, the process sleeps for a fixed (or other) amount of time and then it restarts again checking the TV environment, e.g., through another iteration of the process of FIG. 5.

Figure 6:
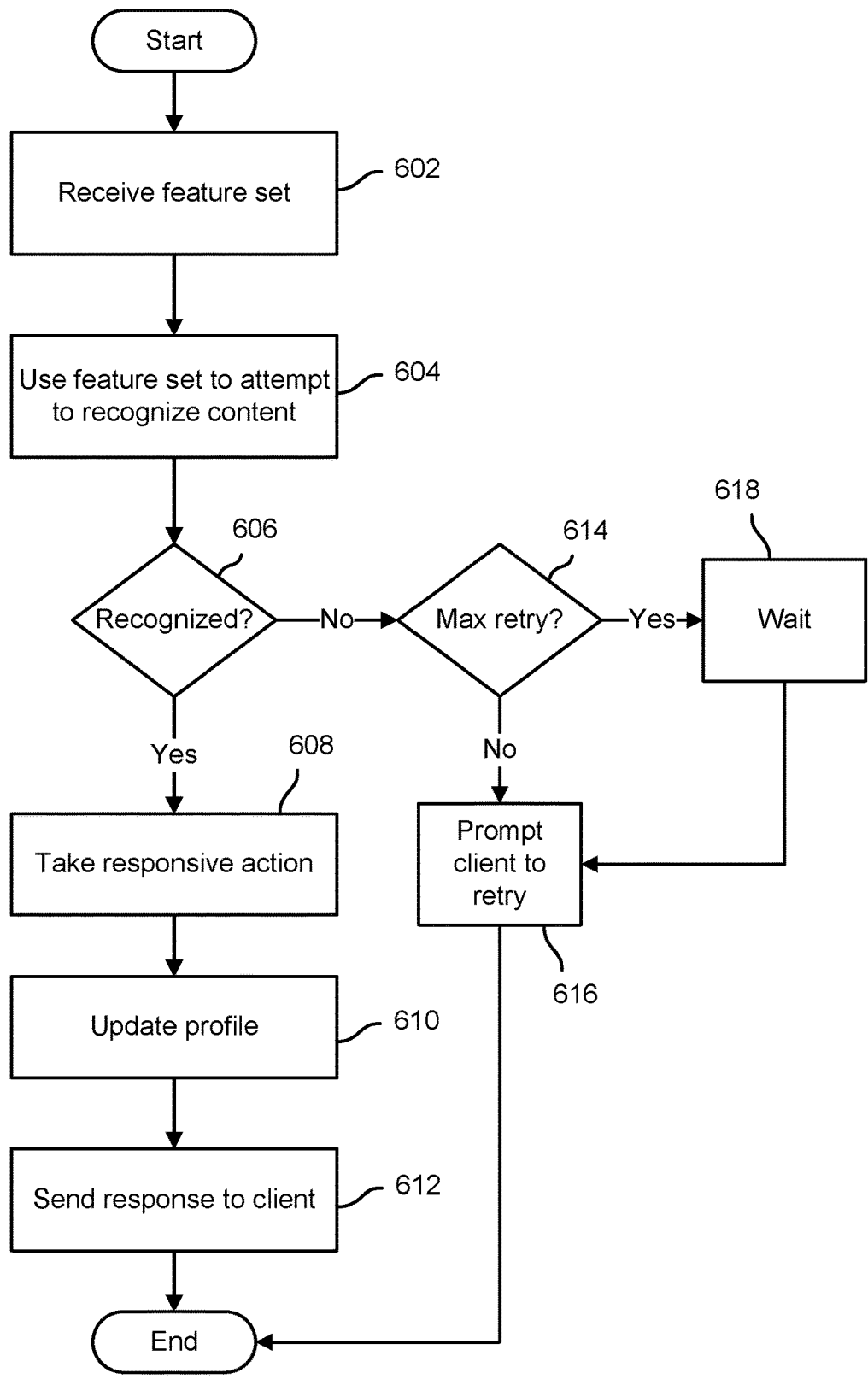
FIG. 6 is a flow chart illustrating an embodiment of a server-side process to determine that TV or other media content is being rendered in an audio environment.

FIG. 6 is a flow chart illustrating an embodiment of a server-side process to determine that TV or other media content is being rendered in an audio environment. In various embodiments, the process of FIG. 6 may be performed by a detection server, such as detection server 112 of FIG. 1. The process of FIG. 6 may be performed on the server side in connection with the performance by a client device of the process of FIG. 5 on the client side. The server may be configured to perform separate instances and/or iterations of the process of FIG. 6 with respect to each of a plurality of associated client devices configured to perform the process of FIG. 5.

In the example shown, a feature set (or other compact representation of ambient audio or other sensory data) is received (602). For example, a client application or other agent on a client device, such as client device 104 of FIG. 1, may have used a microphone of the client device to listen to the ambient audio environment of the client device and extracted the feature set from the data, as in the process of FIG. 5. The received feature set is used to attempt to recognize the content (604). For example, the received feature set may be compared to feature sets or other representations of data associated with media content that is being or has been provided via a media channel, such as a TV channel. For example, a TV channel broadcast stream may be processed in real time to extract feature sets from the content being broadcast (or otherwise provided). In some embodiments, feature sets extracted from broadcasts and/or other content available via cable television or other "on demand" services may be retained for a prescribed and/or configurable period of time, e.g., to be used to detect rebroadcasts, on demand consumption, etc. of said content.

If a channel and/or specific content are recognized (606), responsive action is taken (608). For example, in some embodiments, secondary or other related content may be selected to be provided, e.g., through the client device used to detect that the media content was being rendered at the location of the client device. In another example, an advertisement or commercial offer related to the detected content may be selected to be communicated to the client device. A user, client device, and/or location profile may be updated (610), e.g., to reflect the channel and/or content that has been detected. A response may be sent to the client device (612).

Further examples of how the result of the recognition process may be used at the server include, without limitation, to build a user and/or device profile associated with the device; to perform analytics with which respect to the device and/or user, and/or in aggregate across devices and/or users; to select advertising and/or other content to display to the user via the listening device; and to select advertising and/or other content to display via a TV or other component associated with one or more of the listening device, a user associated with the listening device, and a location associated with either or both of the user and the listening device.

Referring further to FIG. 6, if the server is not able to recognize the media channel and/or content (606), if a maximum number of retries has not yet been met (614) the server prompts the client to retry (616), and a subsequent iteration of the process of FIG. 6 may be performed in response to a feature set sent by the client as a result of the retry. If the prescribed (e.g., configurable) maximum number of retries have already been reached (614), the server waits a prescribed (e.g., configured, random, dynamically determined) amount of time (618) before prompting the client to retry again (616). In some embodiments, the client may be configured to recheck the environment to confirm conditions are right to perform scanning/detection, e.g., based on a timeout (e.g., too much time since feature set sent to server without an affirmative response), a detected change in environmental conditions, and/or a prompt from the server to recheck, etc.

Figure 7:
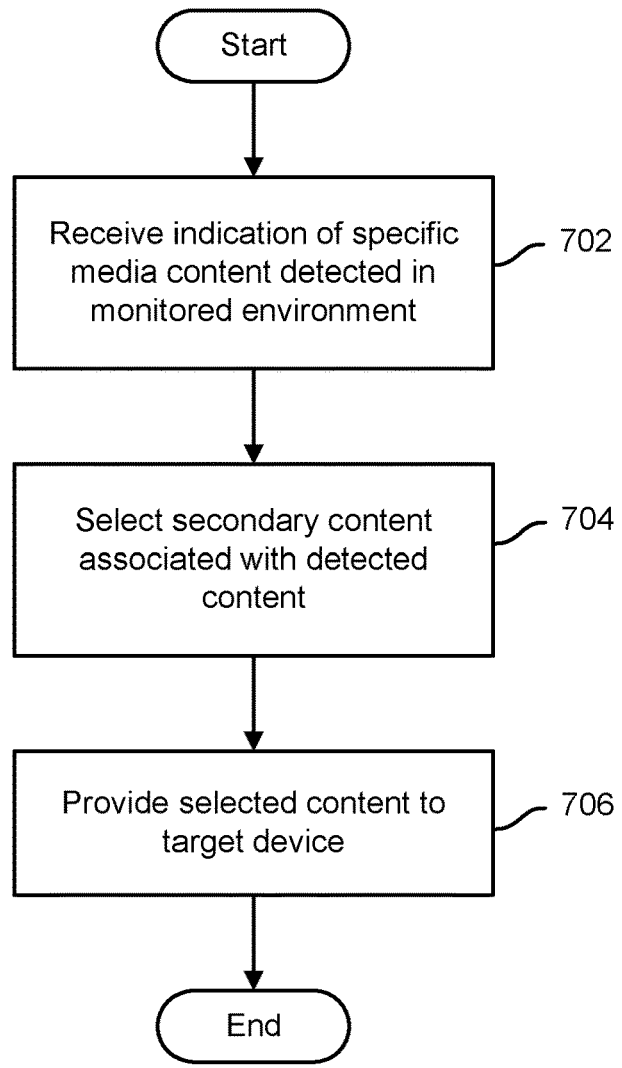
FIG. 7 is a flow chart illustrating an embodiment of a process to provide content related to detected media.

FIG. 7 is a flow chart illustrating an embodiment of a process to provide content related to detected media. In various embodiments, the process of FIG. 7 may be performed by a detection server, such as detection server 112 of FIG. 1, and/or a server or other system configured to selected and provide content based on a media channel and/or content detected by such a detection system. In the example shown, an indication is received of specific media content detected in a monitored environment (702). For example, an indication may be received at a particular cable TV or other channel is being played on a TV or other device located in an environment in which a client device used to perform media content detection as disclosed herein is located. Secondary (or other) content associated with the detected content is selected to be provided (704). For example, an advertisement or other content associated with the detected content, and/or topics with which the detected content has been determined through separate and/or concurrent processing to be associated, may be selected. In some embodiments, an application on the client device involved in detection may be invoked and/or data indicating and/or determined based at least in part on the detected media content may be gathered and/or generated to be provided to the application. The selected (and/or gathered/generated) content is provided to a target device (706). In some embodiments, the content may be provided via a client device used to detect the media content being played in the ambient environment. In some embodiments, the content may be provided via a TV or other media device associated with playing the content that has been detected. In various embodiments, all or part of the content may be provided by a server that detected the media content and/or by an application or other server associate with an application on the client device used to perform the detection and/or a device used to render the detected media content.

Figure 8:
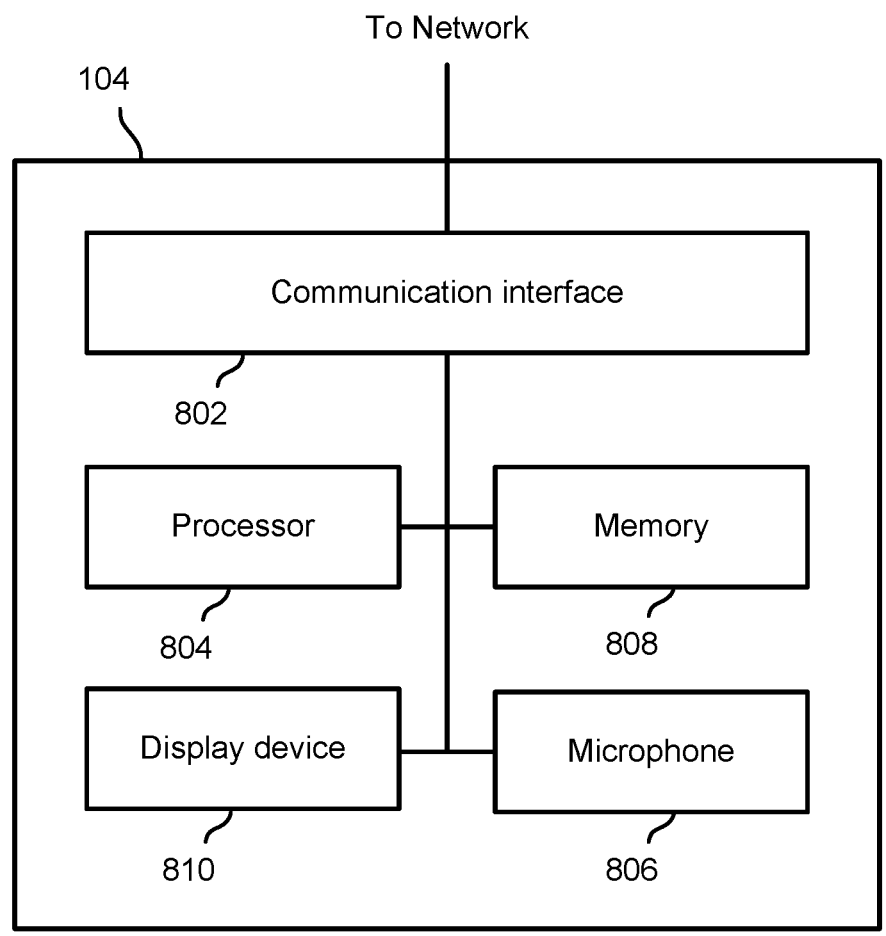
FIG. 8 is a block diagram illustrating an embodiment of a system to detect ambient media.

FIG. 8 is a block diagram illustrating an embodiment of a system to detect ambient media. In the example shown, client device 104 of FIG. 1 includes a communication interface 802 that provides network connectivity, e.g., via an associated mobile network, a WiFi hot spot or other access node, etc. The client device 104 includes a processor 804, which may be configured in various embodiments to run client software, such as client applications that run on a mobile or other operating system running on processor 804. The client device further includes a microphone 806 and associated processing elements configured to receive, process, and provide to internal components of client device 104 audio data based on the audio environment in which the device 104 is located. The client device 104 also includes a memory 808, which may be configured to store audio data generated by microphone 806, computer instructions (e.g. apps) to be executed on processor 804, etc. Finally, in the example shown, client device 104 includes a display device and associated subsystem 810, which may be used to display, e.g., via a display device/screen and/or associated speakers, secondary content provided to the device 104 based on a media content detected as being present (e.g., currently being rendered) in a location in which the client device 104 is located.

In various embodiments, functions, operations, and/or tasks described herein as being performed in some embodiments by a client device, such as client device 104 of FIG. 1, may instead be performed by a server, such as detection server 112 of FIG. 1. Likewise, certain functions described as being performed in some embodiments by a server may be performed at a client device (e.g., selection, generation, and/or retrieval of second content.) While a number of examples described herein relate to television content, the techniques described herein may be used to detect other media content, such as songs, movies, on demand programming, etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method to provide content based on detected ambient media, comprising:

receiving, from a client device via a communication interface, a set of audio features extracted from audio data captured in an audio environment with ambient environment data, wherein the ambient environment data satisfied a threshold level detected by the client device, wherein the client device is to determine whether one or more conditions to perform media recognition are satisfied;

using a processor and a stored media signature data generated based on media content data from a source other than the client device, recognizing, based at least on the set of audio features, a media channel and program that is being played in the audio environment, wherein the recognizing is performed during a time window defined by machine learning of user activity associated with an in-use timing of the source, wherein the time window defined by the machine learning of the user activity comprises applying deep neural networks to clusterize user behavior in a manner that avoids performing the recognizing when the source is not in use;

providing a secondary content that is selected based at least on a semantic content data associated with the recognized media channel and program and client information; and performing a subsequent iteration of the receiving a set of audio features and the using a processor and a stored media data, if a maximum number of retries has not yet been met, in response to a feature set received from the client device as a result of a failure of the processor and the stored media signature data to recognize the media channel and program and client information.

2. The method of claim 1, wherein the client device is to listen to the audio environment and extract the set of audio features.

3. The method of claim 2, wherein the client device is further to send the extracted set of audio feature to a remote media detection server configured to perform said step of using a process and stored media signature data to recognize the media channel and program.

4. The method of claim 1, wherein a client application installed on the client device comprises software code which, when executed using a processor comprising the client device, uses a microphone comprising the client device to listen to the audio environment and uses said processor comprising the client device to extract the set of media features.

5. The method of claim 1, wherein the stored media signature data is generated based at least by processing a media stream associated with the media channel and program.

6. The method of claim 1, wherein the secondary content comprises advertising content.

7. The method of claim 1, wherein the secondary content is provided to a media player, wherein client information includes location information from the client device, wherein the media player is run by another device in the audio environment of the client device.

8. The method of claim 1, wherein the secondary content is provided to another device in the audio environment of the client device.

9. The method of claim 8, wherein the secondary content is provided via a client app installed on the client device.

10. The method of claim 1, wherein the semantic content data comprises one or more topics.

11. The method of claim 1, wherein the semantic content data comprises one or more advertising or other classification codes; and the secondary content is selected based on client information comprising a user profile.

12. The method of claim 1, further comprising determining that the audio environment includes different audio data associated with multiple pieces of media content.

13. The method of claim 1, wherein a determination is made that the source other than the client is in an ON state prior to the recognizing the media channel and the program and the client device.

14. A system to provide content based on detected ambient media, comprising:
 a communication interface; and
 a processor coupled to the communication interface and configured to:
  receive from a client device via the communication interface a set of audio features extracted from the audio data captured in an audio environment with ambient environment data, wherein the ambient environment data satisfied a threshold level detected by the client device, wherein the client device is configured to determine whether one or more conditions to perform media recognition are satisfied;
  use a stored media signature generated based on media content data from a source other than the client device to recognize, based at least on the set of audio features, a media channel and program that is being played in the audio environment, and during a time window defined by machine learning of user activity associated with an in-use timing of the source, wherein the time window defined by the machine learning of the user activity comprises applying deep neural networks to clusterize user behavior in a manner that avoids performing the recognizing when the source is not in use;
  provide a secondary content that is selected based in part on a semantic content data associated with the recognized media channel and program and client information; and
  perform a subsequent iteration of the receiving a set of audio features and the using a processor and a stored media data, if a maximum number of retries has not yet been met, in response to a feature set received from the client device as a result of a failure of the processor and the stored media signature data to recognize the media channel and program and client information.

15. The system of claim 14, wherein the stored media signature data is generated based at least in part by processing a media stream associated with the media channel and program.

16. The system of claim 14, wherein the secondary content is provided to another device in the audio environment of the client device.

17. The system of claim 14, wherein the semantic content data comprises one or more advertising or other classification codes; and the secondary content is selected based on client information comprising a user profile.

18. The system of claim 14, further comprising determining that the audio environment includes audio data associated with media content.

19. A computer program product to provide content based on detected ambient media, the computer program product being embodied in a non-transitory computer readable storage medium and comprising computer instructions for:
 receiving from a client device via a communication interface a set of audio features extracted from audio data captured in an audio environment with ambient environment data, wherein the ambient environment data satisfied a threshold level detected by the client device, wherein the client device is configured to determine whether one or more conditions to perform media recognition are satisfied;
 using a processor and a stored media signature data generated based on media content data from a source other than the client device, recognizing, based at least on the set of audio features, a media channel and program that is being played in the audio environment, wherein the recognizing is performed during a time window defined by machine learning of user activity associated with an in-use timing of the source, wherein the time window defined by the machine learning of the user activity comprises applying deep neural networks to clusterize user behavior in a manner that avoids performing the recognizing when the source is not in use;
 providing a secondary content that is selected based at least on a semantic content data associated with the recognized media channel and program and client information; and
 performing a subsequent iteration of the receiving a set of audio features and the using a processor and a stored media data, if a maximum number of retries has not yet been met, in response to a feature set received from the client device as a result of a failure of the processor and the stored media signature data to recognize the media channel and program and client information.

* * * * *